(12) United States Patent
Kumar et al.

(10) Patent No.: US 9,942,098 B2
(45) Date of Patent: *Apr. 10, 2018

(54) APPLIANCE NODE CLUSTERS

(71) Applicant: INTERNATIONAL BUSINESS MACHINES CORPORATION, Armonk, NY (US)

(72) Inventors: Sanjeev Kumar, Pune (IN); Jayrama S. Praturi, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/218,708

(22) Filed: Jul. 25, 2016

(65) Prior Publication Data

US 2016/0337192 A1    Nov. 17, 2016

Related U.S. Application Data

(63) Continuation of application No. 13/912,351, filed on Jun. 7, 2013, now Pat. No. 9,438,674.

(51) Int. Cl.
*G06F 15/16* (2006.01)
*H04L 12/24* (2006.01)
*H04L 29/08* (2006.01)
*H04L 12/28* (2006.01)

(52) U.S. Cl.
CPC ...... *H04L 41/0893* (2013.01); *H04L 12/2801* (2013.01); *H04L 67/10* (2013.01); *H04L 67/1097* (2013.01)

(58) Field of Classification Search
CPC . H04L 41/0893; H04L 12/2801; H04L 67/10; H04L 67/1097
See application file for complete search history.

(56) References Cited

U.S. PATENT DOCUMENTS

| 7,730,057 B2 | 6/2010 | Bell et al. |
| 8,060,695 B1 | 11/2011 | Lee et al. |
| 8,078,707 B1 | 12/2011 | Watsen et al. |

(Continued)

OTHER PUBLICATIONS

Office Action (dated Nov. 2, 2015) for U.S. Appl. No. 13/912,351, filed Jun. 7, 2013; Confirmation No. 3614.

(Continued)

*Primary Examiner* — Viet Vu
(74) *Attorney, Agent, or Firm* — Schmeiser, Olsen & Watts; John Pivnichny

(57) ABSTRACT

An appliance interconnection system and method. The system includes a high speed private local area network (LAN) and a logical cluster of appliances comprising a plurality of physical sub-clusters of appliance nodes. Each node of the appliance nodes includes a different generation node. The plurality of sub-clusters are interconnected via the high speed private LAN. A sub-cluster (N) of the plurality of physical sub-clusters comprises a first plurality of nodes of the appliance nodes. The sub-cluster (N) is associated with a plurality of (M) generation appliances of the logical cluster of appliances. Each appliance of the plurality of (M) generation appliances comprises a same type of appliance. (N) comprises a first cluster number and (M) comprises a first generation number of a first generation. The plurality of sub-clusters, in combination, form a single logical cluster.

16 Claims, 18 Drawing Sheets

(56) References Cited

U.S. PATENT DOCUMENTS

| | | | |
|---|---|---|---|
| 8,352,785 | B1 | 1/2013 | Nicklin et al. |
| 8,788,639 | B2 | 7/2014 | Borowski |
| 9,438,674 | B2 | 9/2016 | Kumar et al. |
| 9,450,859 | B2 * | 9/2016 | Swain ................ H04L 61/2038 |
| 2007/0256085 | A1 | 11/2007 | Reckamp et al. |
| 2011/0078490 | A1 | 3/2011 | He et al. |
| 2012/0290805 | A1 | 11/2012 | Bish et al. |
| 2013/0024481 | A1 | 1/2013 | Bolesta et al. |
| 2013/0080559 | A1 | 3/2013 | Rao et al. |
| 2014/0365610 | A1 | 12/2014 | Kumar et al. |

OTHER PUBLICATIONS

Amendment filed Feb. 2, 2016 in response to Office Action (dated Nov. 2, 2015) for U.S. Appl. No. 13/912,351, filed Jun. 7, 2013; Confirmation No. 3614.
Final Office Action (dated Mar. 11, 2016) for U.S. Appl. No. 13/912,351, filed Jun. 7, 2013; Confirmation No. 3614.
Amendment filed May 11, 2016 in response to Final Office Action (dated Mar. 11, 2016) for U.S. Appl. No. 13/912,351, filed Jun. 7, 2013; Confirmation No. 3614.
Notice of Allowance (dated Jun. 1, 2016) for U.S. Appl. No. 13/912,351, filed Jun. 7, 2013; Confirmation No. 3614.

* cited by examiner

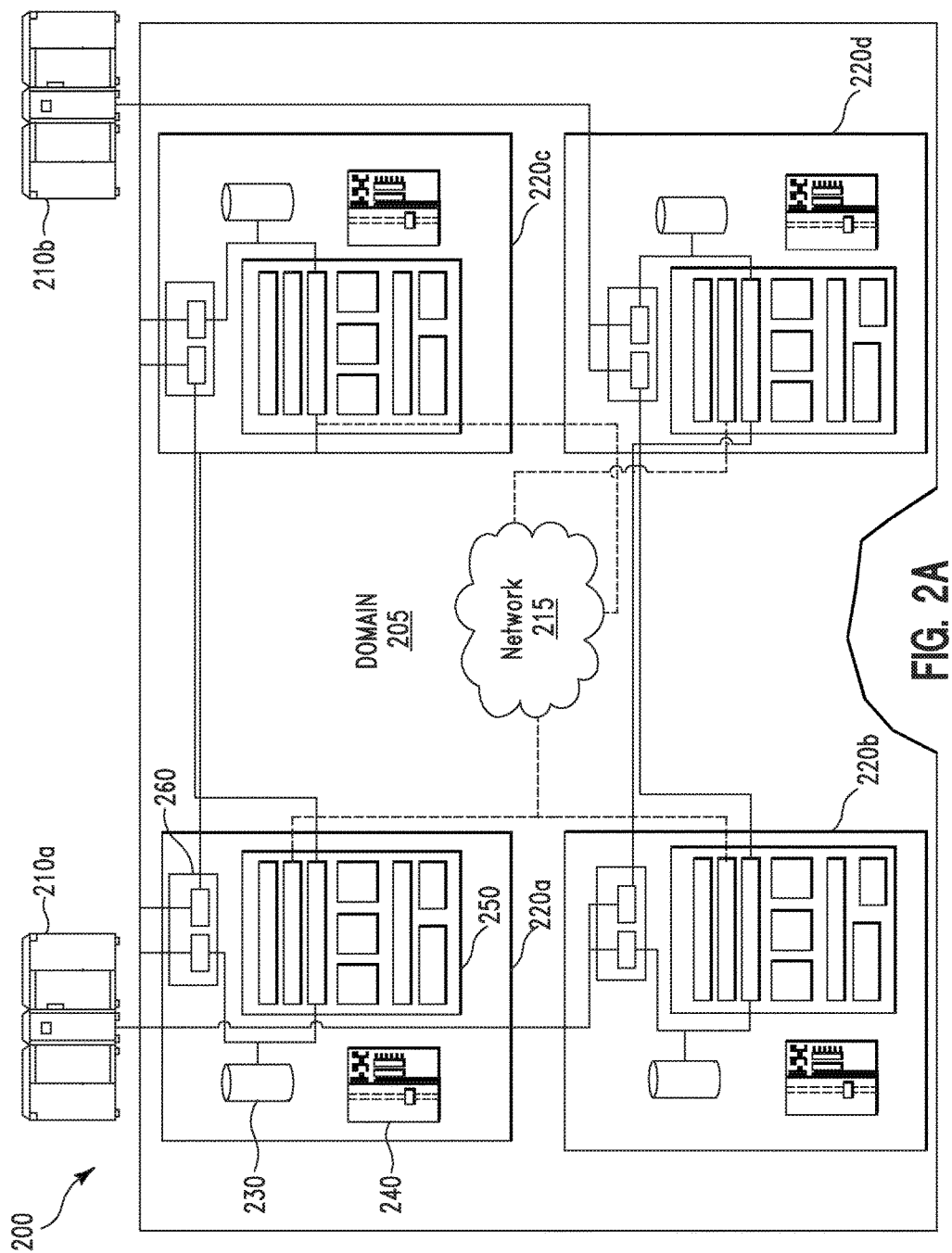

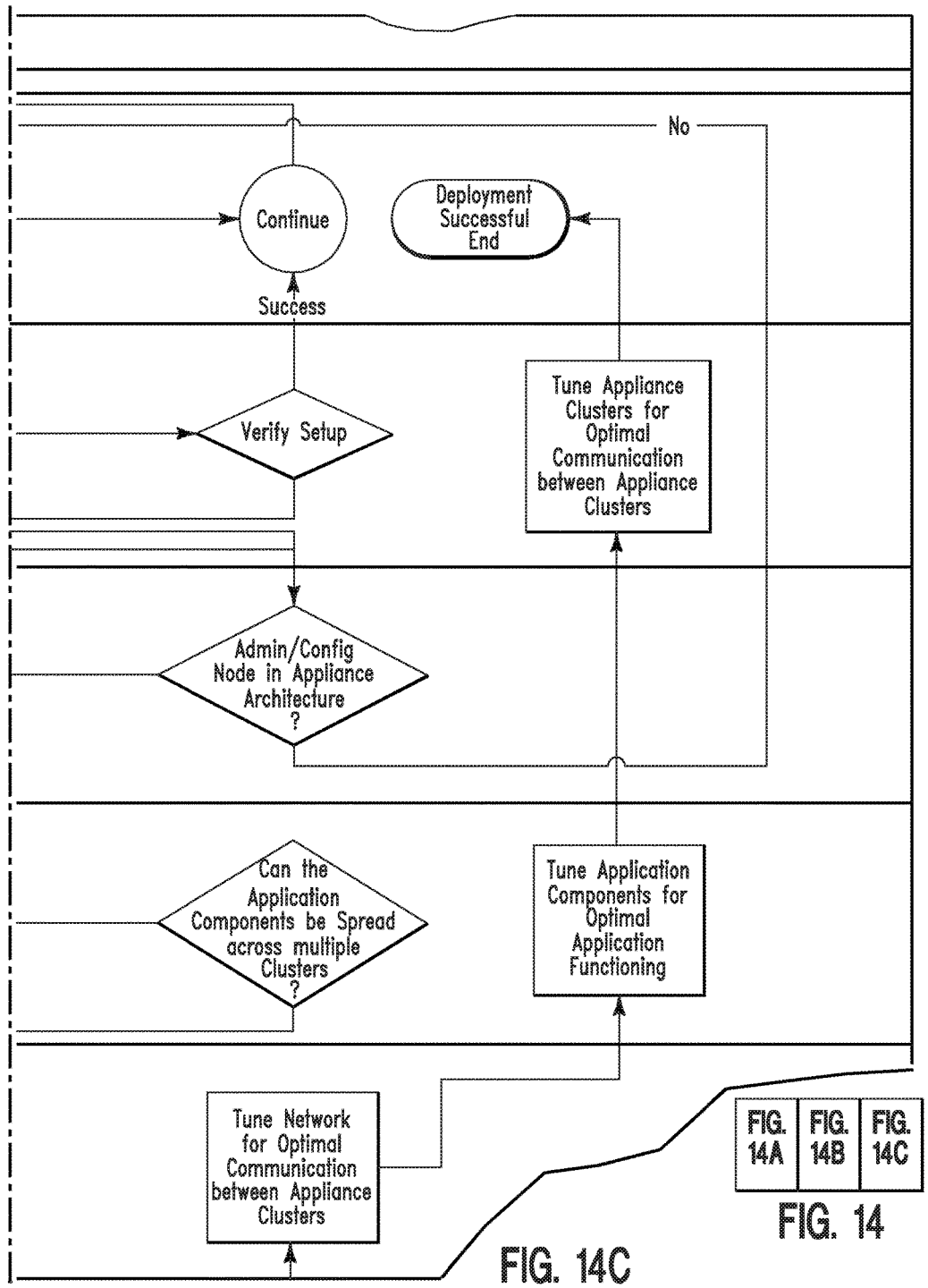

APPLIANCE NODE CLUSTERS

This application is a continuation application claiming priority to Ser. No. 13/912,351 filed Jun. 7, 2013, now U.S. Pat. No. 9,438,674 issued Sep. 6, 2016.

FIELD

One or more embodiments of the invention relate generally to a method for interconnecting appliances, and in particular to a method and associated system for forming a single logical cluster from a plurality of sub-cluster of appliance nodes.

BACKGROUND

Connecting devices of different types typically includes an inaccurate process with little flexibility. Communications between devices of different types may include a complicated process that may be time consuming and require a large amount of resources. Accordingly, there exists a need in the art to overcome at least some of the deficiencies and limitations described herein above.

SUMMARY

A first embodiment of the invention provides a system comprising: a high speed private local area network (LAN); and a logical cluster of appliances comprising a plurality of physical sub-clusters of appliance nodes, wherein each node of the appliance nodes comprises a different generation node, wherein the plurality of sub-clusters are interconnected via the high speed private LAN, wherein a sub-cluster (N) of the plurality of physical sub-clusters comprises a first plurality of nodes of the appliance nodes, wherein the sub-cluster (N) is associated with a plurality of (M) generation appliances of the logical cluster of appliances, wherein each appliance of the plurality of (M) generation appliances comprises a same type of appliance, wherein (N) comprises a first cluster number, wherein (M) comprises a first generation number of a first generation, and wherein the plurality of sub-clusters, in combination, form a single logical cluster.

A second embodiment of the invention provides a method comprising: providing, a logical cluster of appliances interconnected via a high speed private local area network (LAN), wherein the logical cluster of appliances comprises a plurality of physical sub-clusters of appliance nodes; determining, by a computer processor, that each node of the appliance nodes comprises a different generation node, wherein the plurality of sub-clusters are interconnected via the high speed private LAN; determining, by the computer processor, that a sub-cluster (N) of the plurality of physical sub-clusters comprises a first plurality of nodes of the appliance nodes; determining, by the computer processor, that the sub-cluster (N) is associated with a plurality of (M) generation appliances of the logical cluster of appliances, wherein each appliance of the plurality of (M) generation appliances comprises a same type of appliance, wherein (N) comprises a first cluster number, and wherein (M) comprises a first generation number of a first generation; and forming, by the computer processor, a single logical cluster from a combination of the plurality of sub-clusters.

A third embodiment of the invention provides a computer program product, comprising a computer readable hardware storage device storing a computer readable program code, the computer readable program code comprising an algorithm that when executed by a computer processor of a computer system implements a method, the method comprising: determining, by a computer processor, that each node of appliance nodes comprises a different generation node, wherein a logical cluster of appliances are interconnected via a high speed private local area network (LAN), wherein the logical cluster of appliances comprises a plurality of physical sub-clusters of the appliance nodes, and wherein the plurality of sub-clusters are interconnected via the high speed private LAN; determining, by the computer processor, that a sub-cluster (N) of the plurality of physical sub-clusters comprises a first plurality of nodes of the appliance nodes; determining, by the computer processor, that the sub-cluster (N) is associated with a plurality of (M) generation appliances of the logical cluster of appliances, wherein each appliance of the plurality of (M) generation appliances comprises a same type of appliance, wherein (N) comprises a first cluster number, and wherein (M) comprises a first generation number of a first generation; and forming, by the computer processor, a single logical cluster from a combination of the plurality of sub-clusters.

The present invention advantageously provides a simple method and associated system capable of connecting devices of different types.

BRIEF DESCRIPTION OF THE DRAWINGS

FIGS. 2A and 2B illustrate schematic block diagrams illustrating an embodiment of a storage system, in accordance with embodiments of the present invention.

FIG. 14, including FIGS. 14A, 14B, and 14C, illustrates an algorithm detailing a system flow defining identification and application of appliance interconnection architecture, in accordance with embodiments of the present invention.

FIG. 15, including

DETAILED DESCRIPTION

Figure 1:
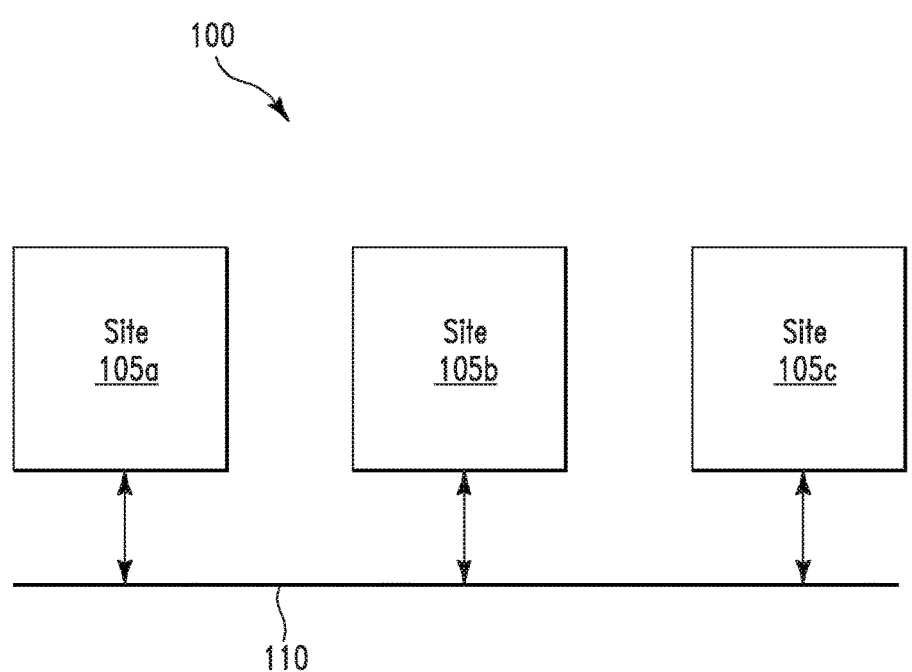
FIG. 1 is a schematic block diagram illustrating an embodiment of distributed sites in accordance with the present invention.

FIG. 1 is a schematic block diagram illustrating an embodiment of distributed sites 100 in accordance with the present invention. The distributed sites 100 include a plurality of sites 105. Each site 105 communicates with the other sites 105 over a network 110. The network 110 may be the Internet, local area network (LAN), wide area network (WAN), a dedicated network, a combination of networks, and the like. Each site 105 may include one or more storage systems as will be described hereafter. In addition, each site 105 may include bridges, routers, and the like that connect the storage systems to the network 110.

Figure 2B:
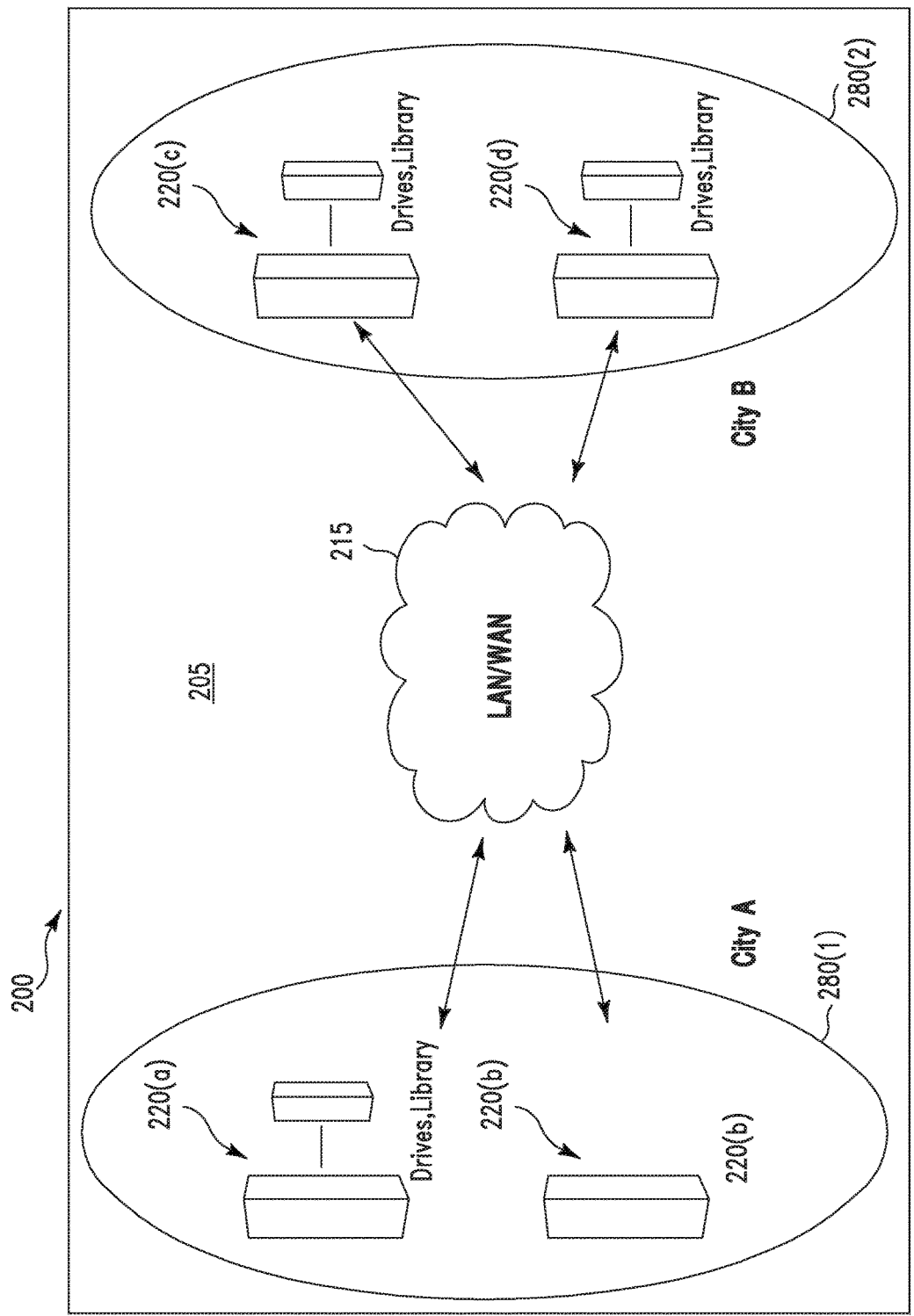

FIGS. 2A and 2B are schematic block diagrams illustrating an embodiment of a storage system 200 in accordance with the present invention. The storage systems 200 may store data in different physical media, including, but not limited to, storage cartridges, disk drives, solid state disks (SSD), disks direct access storage devices (DASD), magnetic tape drives, libraries, and disk drive arrays, such as RAID (redundant array of independent disks), or JBOD (just a bunch of disks). An example of a storage cartridge is a magnetic tape cartridge, which includes a rewritable magnetic tape wound on a hub of reel, and a cartridge memory. One example of a magnetic tape cartridge includes a cartridge based on LTO (Linear Tape Open) technology. The storage systems 200 may store data in different forms, such as logical or virtual data. Herein, data may be organized in any of various forms, called "volumes" or "objects", the terms chosen without reference to any particular size or arrangement of data.

As illustrated in FIGS. 2A and 2B, the storage system 200 provides storage for a plurality of host systems 210. For example, the storage system 200 includes a plurality of hosts 210, a plurality of clusters 220, and a network 215. Although for simplicity, two (2) hosts 210a, 210b, four (4) clusters 220a, 220b, 220c, 220d and one (1) network 215 are shown in FIG. 2A, any number of hosts 210, clusters 220, and networks 215 may be employed. Accordingly, any number of clusters 220 may be included in storage system 200.

As illustrated in FIG. 2A, the storage system 200 may employ four (4) clusters 220a, 220b, 220c, 220d connected by a network 215 with each cluster 220 including a virtualization node ("VN") 260 and a storage device 230 for emulating a tape drive or tape library to hosts 210a, 210b. In an embodiment, clusters 220a, 220b, 220c, 220d are virtual tape server cluster.

The hosts 210 may communicate with the cluster 220 over the network 215 to access a plurality of magnetic tape drives, disk drives, and other storage devices through the cluster family members 220 as will be described hereafter. For example, a first host 210a may communicate over the network 215 to access a storage device and a magnetic tape through a first cluster 220a.

Each of the clusters 220 may be connected between themselves and with the hosts 210 over the network 215 to access data written on the magnetic tape and/or to write data to the magnetic tape. The plurality of clusters 220 may form a domain 205 of the storage system 200. The domain 205 may represent a multi-cluster or grid configuration. The domain 205 may include two or more clusters 220.

The network 215 of the storage system 200 may be storage area network (SAN), a token ring network, local area network (LAN), wide area network (WAN), the Internet, a dedicated network, a combination of networks, and the like. The SAN may consist of a "fabric" through which the hosts 210 may communicate with the clusters 220 over the network 215. The fabric may include a Fiber Channel network, an Ethernet network, or the like. All elements may not share the same fabric for communication. The first host 210a may communicate with the first cluster 220a over one fabric. In addition, the first host 210a may communicate with a third cluster 220c over another fabric.

Each storage system 200 may include a cluster family 280. The cluster family 280 may include a plurality of cluster family members 220 that are arranged, configured, organized, and/or grouped into the cluster family 280. For example, as illustrated in FIG. 2B, storage system 200 includes cluster family 280(1) and cluster family 280(2). Cluster family 280(1) includes a plurality of cluster 220(a), 220(b) grouped into family members of cluster family 280(1). Cluster family 280(2) includes a plurality of cluster family members 220(b), 220(c) grouped into family members of cluster family 280(2). Cluster family 280(1) and cluster family 280(2) communicate with each via network, such as network 110, 215. Each cluster family 280 may be given or assigned a name. For example, cluster family 280(1) may be named as City A and cluster family 280(2) may be named as City B.

Although, for simplicity, FIG. 2B illustrates a storage system 200 having two cluster families 280. Any number of storage systems 200, cluster families 280, and cluster family members 220 may be employed.

Figure 3:
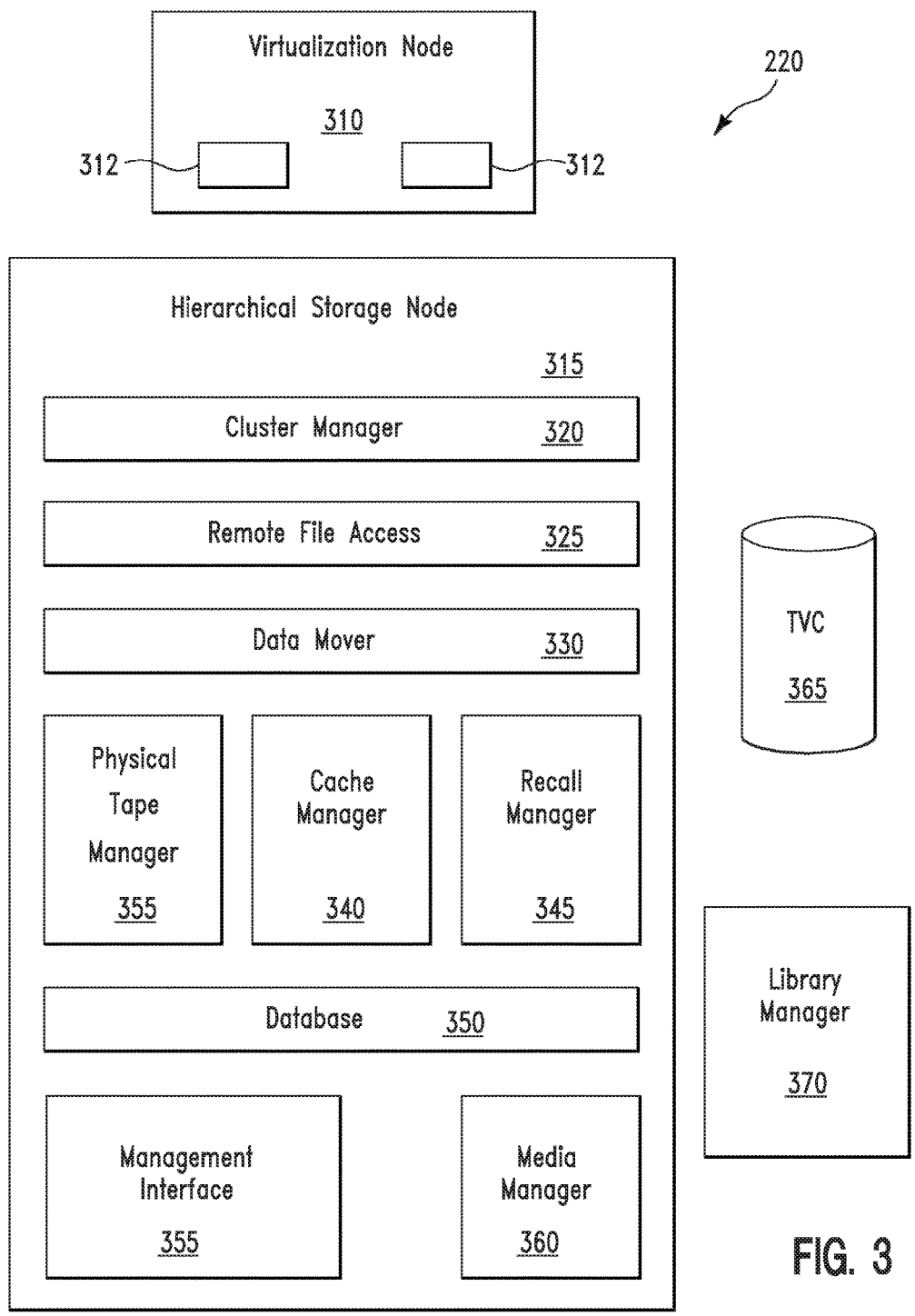
FIG. 3 is a schematic block diagram illustrating an embodiment of a cluster, in accordance with embodiments of the present invention.

FIG. 3 is a schematic block diagram illustrating an embodiment of a cluster 220 of the present invention. The cluster 220 may represent a cluster family member 220 of cluster family 280 of FIGS. 2A and 2B, for example. The description of cluster 220 refers to elements of FIGS. 1-2, like numbers referring to like elements. The cluster 220 may include a virtualization node 310, a hierarchical storage node 315, a volume cache 365, and a library manager 370.

The storage device 230 may include one or more disk drives, for example, arranged as a redundant array of independent disks (RAID) or just a bunch of disks (JBOD), or solid state disk (SSD), etc. The storage device 230 may include the volume cache 365. The volume cache 365 may serve as a virtual volume cache and/or tape volume cache (TVC).

For example, storage device 230 includes a virtual volume cache 365. The virtual volume cache 365 may serve as a TVC, wherein the TVC includes a rapidly accessible storage device such as a hard disk drive. In an embodiment, cluster 220 operates to cache data to the TVC 365.

The TVC 365 may cache data that is read from the logical volume and/or cache data that is to be written to the logical volume. A host 210 may make repeated writes to a logical volume. The TVC 365 may store the written data on a hard disk drive 230 without writing the data to the logical volume's magnetic tape. At a later time, the TVC 365 may write the cached data to the magnetic tape within tape library 240. Accordingly, operations such as read operations and write operations for a virtual tape drive mounting a logical volume may be routed through the TVC 365.

A host 210 may initiate and run task and/or jobs on the cluster 220. For example, a first host 210a access may result in an actuator of the library manager 370 being controlled by a physical tape manager 335 to transfer a tape cartridge from a storage area to a tape drive in order to access data written on the magnetic tape and/or to write data to the magnetic tape and/or TVC 365.

The virtualization node 310 may be an independent processor-based server with multiple connections to the network 215. The virtualization node 310 may include either a battery backup unit (BBU) and/or may have access to an uninterruptible power supply (UPS). The virtualization node 310 may contain a watchdog timer. The watchdog timer may ensure that a failing virtualization node 310 that is not able and/or takes a long time to recover may be restarted.

The virtualization node 310 may include one or more tape daemon 312. The tape daemon 312 may emulate a tape drive of the cluster 220 to the host 210 as a virtual tape drive. The tape daemon 312 may operate on a file that is either on the TVC 365 and/or may operate on a file in a remote TVC 365 of another cluster 220 through a remote file access 325.

The hierarchical storage node 315 may include a cluster manager 320, the remote file access 325, a data mover 330, the physical tape manager 335, a cache manager 340, a recall manager 345, a database 350, a management interface 355, and a media manager 360. The cluster manager 320 may coordinate operations between the pluralities of clusters 220 in a multi-cluster or grid topology.

The cluster manager 320 may use tokens to determine which cluster 220 has a current copy of the data. The tokens may be stored in the database 350. The cluster manager 320 may also coordinate copying data between the clusters 220. The cluster manager 320 may include one or more processors configured to execute computer readable programs as is well known to those of skill in the art.

The remote file access 325 may be a server, one or more processors, or the like. The remote file access 325 may provide a link to the TVC 365 for access by any remote cluster 220. The cluster manager 320 may include a computer readable program.

The data mover 330 may control the actual data transfer operations for copies performed between clusters 220 and also may transfer of data between physical tape media and the TVC 365. The data mover 330 may include a computer readable program.

The physical tape manager 335 may control the physical tapes in the cluster 220. The physical tape manager 335 may manage the physical tapes in multiple pools, reclamation, borrowing and returning of volumes from and to a common scratch pool, and transfer tapes between pools. The physical tape manager 335 may include a computer readable program.

The cache manager 340 may control the copying of data from the TVC 365 to the physical tapes and the subsequent removal of a redundant copy of data from the TVC 365. The cache manager 340 may also provide the control signals to balance data flow between the different components and the TVC 365. The cache manager 340 may include a computer readable program.

The recall manager 345 may queue and control recall of data into the TVC 365 from physical media for either a virtual tape drive or copies requested by the cluster manager 320. The recall manager 345 may include a computer readable program.

The database 350 may be a structured collection of records that may be stored on a hard disk drive. The records may include the locations of data on magnetic tape. The host 210 may write the data to the magnetic tape of the cluster 220 and/or may access the data from the magnetic tape using database addresses to provide the data to a user.

The management interface 355 may provide information about the cluster 220 to the user. Also, the management interface 355 may allow the user to control and configure the cluster 220. The management interface 355 may include a computer cathode ray tube (CRT), a liquid crystal display (LCD) screen, a keyboard, or the like, or exist as a web based interface.

The media manager 360 may manage the physical handling of the magnetic tapes of the cluster 220. Also, the media manager 360 may manage error recovery of the magnetic tapes of the cluster 220. The media manager 360 may diagnose errors and may determine if the errors are caused by the physical tape drives or by the physical tape media. Further, the media manager 360 may take appropriate action for error recovery.

The library manager 370 may include plurality of physical tape drives, a robotic accessor, and a plurality of physical tape media. The robotic accessor of the library manager 370 may transfer the magnetic tape to a tape drive assigned to the TVC 365. A virtual tape drive may be a logical construct that appears to the host 210 as a physical tape drive. The data may be read from or written to the magnetic tape of the tape drive through a read/write channel as is well known to those skilled in the art.

Each tape drive of the plurality of clusters 220 may employ one or more magnetic tapes to store the data. The magnetic tape may act as a storage media of the data in the storage system 200. The cluster 220 may employ any number of tape drives and magnetic tapes. For example, the storage system 200 may employ two (2) tape drives and two hundred fifty six (256) virtual drives.

The TVC 365 may contain data from tape volumes being operated on and stores additional volume data for rapid access. Operations such as read operations and write operations for a virtual tape drive mounting a volume may be routed through the TVC 365. Thus selecting a cluster 220 may select the cluster's TVC 365. All the magnetic tapes of the tape drive may be organized as one or more logical volumes or volumes. The volumes in the TVC 365 may be managed using a first in first out (FIFO) and/or a least recently used (LRU) algorithm.

The TVC 365 may be a rapidly accessible storage device. For example, the TVC 365 may be a hard disk drive with a storage capacity of five thousand four hundred gigabytes (5400 GB) or the like. In the storage system 200, the tape drive may cache data to the TVC 365 that is to be read from the logical volume and/or may cache data that is to be written to the logical volume. For example, the host 210 may make repeated writes to a virtual tape drive. The TVC 365 may store the written data on the hard disk drive without writing the data to the virtual magnetic tape. At a later time, the cache manager 340 may write the cached data to the magnetic tape of the cluster 220.

The virtualization node 310 that accessed a volume may be referred to as a mount-point. Choosing a remote cluster TVC 365 that was used for a recent mount-point for a logical volume may improve access to the volume. The high-availability, fast-write storage of the TVC 365 allows the hosts 210 to write data to the TVC 365 without having to wait for the data to be written to a physical disk.

In an embodiment, each site 105 comprises a storage system 200. Each storage system 200 comprises two or more cluster family members 220 grouped together to create a cluster family 280. For example, cluster family 280(1) comprises a group of cluster family members 220(a) and 220(b) and cluster family 280(2) comprising a group of cluster family members 220(c) and 220(d). Cluster family 280(1) may be used for production purposes and cluster family 280(2) may be used for DR or archival purposes, for example. Accordingly, cluster families 280 may perform different roles with respect to other cluster families 280. In addition, cluster family members 220 of a cluster family 280 may perform different roles with respect to each other within the cluster family 280. Accordingly, cluster family members 220 of a cluster family 280 may perform different roles with respect to non-family members.

In an embodiment, cluster families 280 may be configured at global distances, metro distances, or combinations thereof. Similarly, cluster family members 220 may be configured at global distances, metro distances, or combinations thereof. In addition, the cluster family members 220 may have different distant ratings from each other in a cluster family 280. Similarly, cluster families 280 may have different distant ratings between each other. While distant ratings may be used as a factor to define roles and relationships between cluster families 280 and cluster family members 220, this is but just a factor in bringing relationship awareness between the cluster family members 220 and cluster families 280. Thus, arranging or grouping clusters 220 into cluster family members of a cluster family 280 is not limited to distances.

Additionally, because each storage system 200 includes a cluster family 280 created by grouping two or more clusters 220 into family members, each storage system 200 or combination of storage systems 200 may represent a multi-cluster configuration or grid.

Furthermore, the clusters 220 of storage system 200 may form distributed store configuration. For example, a second cluster 220(b) may create a secondary instance of a volume. The secondary instance may be synchronized with the primary copy on a first cluster 220(a), wherein the secondary copy is updated any time the primary copy is updated. The secondary instance may be stored in another cluster family 280 located at a remote site 105 in order to ensure availability of data in case the primary instance becomes unavailable. Future mount-point accesses may choose the secondary copy as the primary copy. Transparent data migration may be used when adding, removing, and/or rebalancing data to a magnetic tape.

Figure 4:
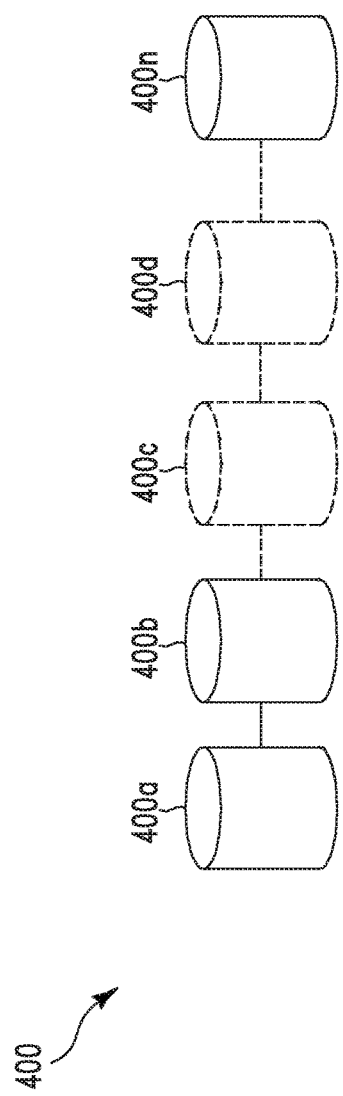
FIG. 4 illustrates a system comprising balanced configuration units (BCU) for deploying appliances, in accordance with embodiments of the present invention.

FIG. 4 illustrates a system 400 comprising balanced configuration units (BCU) 400a . . . 400n for deploying appliances, in accordance with embodiments of the present invention. An (computer) appliance is defined herein as a separate and discrete hardware device that includes integrated software (firmware) and designed to provide a specific computing resource. Hardware and software (of an appliance) are pre-integrated and pre-configured before delivery to customer. System 400 comprises a balanced configuration unit (BCU) configuration and warehouse table deployment system. A BCU may be deployed as an appliance. A balanced configuration methodology allows for carefully balancing a defined combination of resources related to a data warehouse. The resources may include, inter alia, processors, memory, I/O, storage, DB2(R) database partitions, DB2 configuration parameters under a single operating system, etc. The resources are divided and balanced to construct a single practical building block that is scalable. Larger systems may be configured by combining several building blocks into one system image. A building block is referred to as a BCU. A BCU comprises a minimum replicable hardware and software stack necessary to initiate or expand an infrastructure of business intelligence (BI) system, and provides a scalable performance ratio of disk I/O to memory to CPU to a network. A balanced configuration avoids bottlenecks that limit an overall performance.

Figure 5:
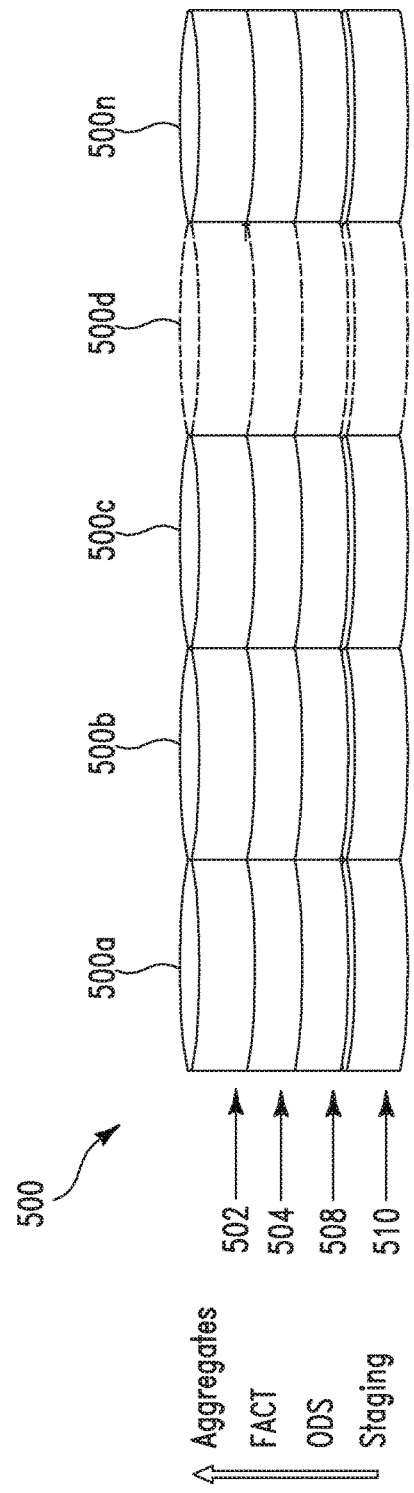
FIG. 5 illustrates a system comprising alternative BCUs for deploying appliances, in accordance with embodiments of the present invention.

FIG. 5 illustrates a system 500 comprising BCUs 500a . . . 500n for deploying appliances, in accordance with embodiments of the present invention. System 500 comprises tables stripped across all clustered BCUs 500a . . . 500n. System 500 comprises an aggregates level 502, a FACT level 504, an ODS level 508, and a staging level 510.

Figure 6:
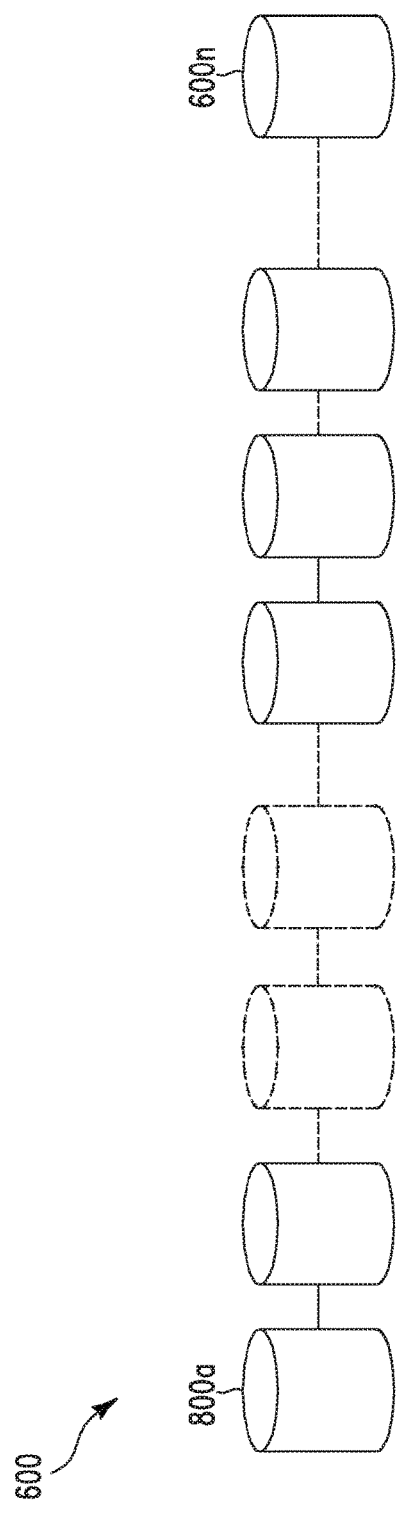
FIG. 6 illustrates a system comprising alternative BCUs for deploying appliances, in accordance with embodiments of the present invention.

FIG. 6 illustrates a system 600 comprising BCUs 600a . . . 600n for deploying appliances, in accordance with embodiments of the present invention. System 600 comprises a cluster configuration that includes ISAS appliances added to a BCU cluster.

Figure 7:
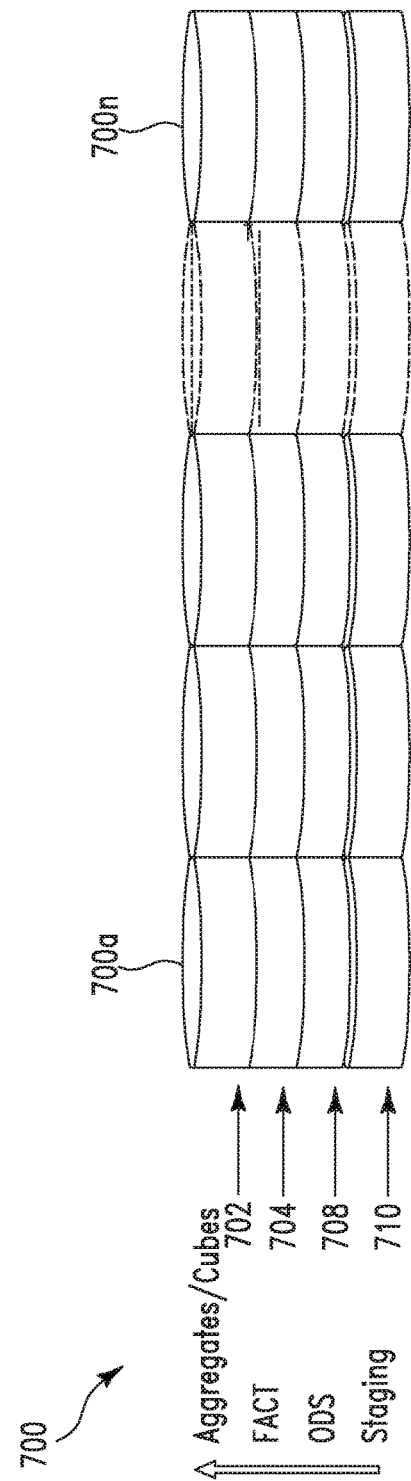
FIG. 7 illustrates a system comprising alternative BCUs for deploying appliances, in accordance with embodiments of the present invention.

FIG. 7 illustrates a system 700 comprising BCUs 700a . . . 700n for deploying appliances, in accordance with embodiments of the present invention. System 700 comprises tables stripped across clustered BCUs 700a . . . 700n and ISAS. System 700 comprises an aggregates level 702, a FACT level 704, an ODS level 708, and a staging level 710.

Figure 8:
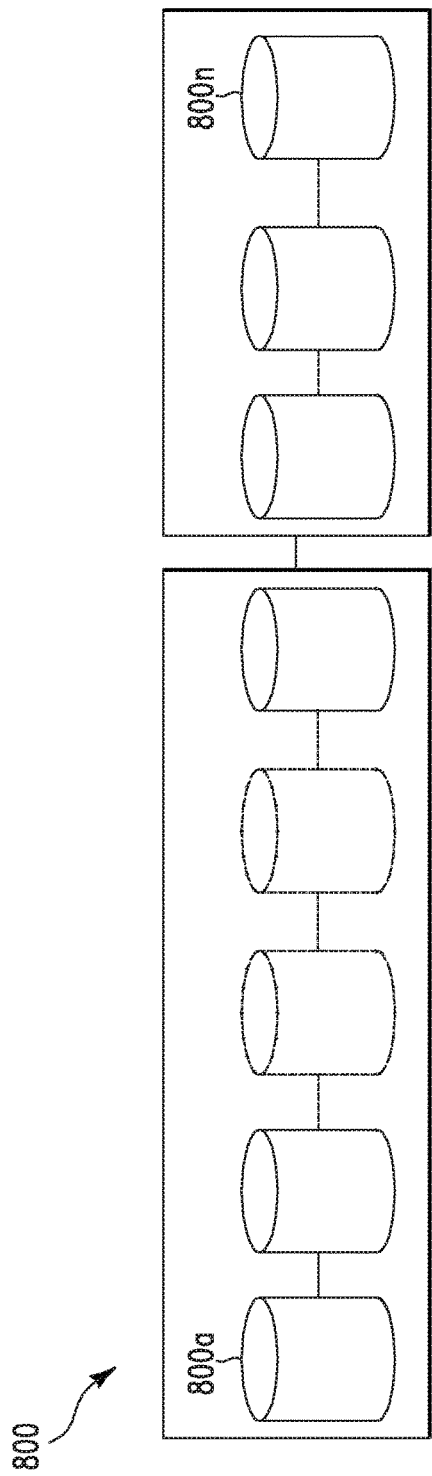
FIG. 8 illustrates a system comprising alternative BCUs for deploying for deploying appliances of same category/family but different generations as a cluster of clusters, in accordance with embodiments of the present invention.

FIG. 8 illustrates a system 800 comprising BCUs 800a . . . 800n for deploying for deploying appliances of same category/family but different generations as a cluster of clusters, in accordance with embodiments of the present invention. System 800 allows an entire cluster to appear as one logical unit at an application level while appliances are divided into multiple physical clusters at a hardware level. System 800 provides an appliance interconnection architecture where a high speed private local area network (LAN) is used for interconnecting clusters such that an entire application appears as one logical unit at an application level but application architecture to distribute data ingestion and computation tasks to one appliance cluster and user workload (i.e., standard and ad-hoc) to another appliance cluster while making appearing as a single logical enterprise data warehousing (EDW) application.

Figure 9:
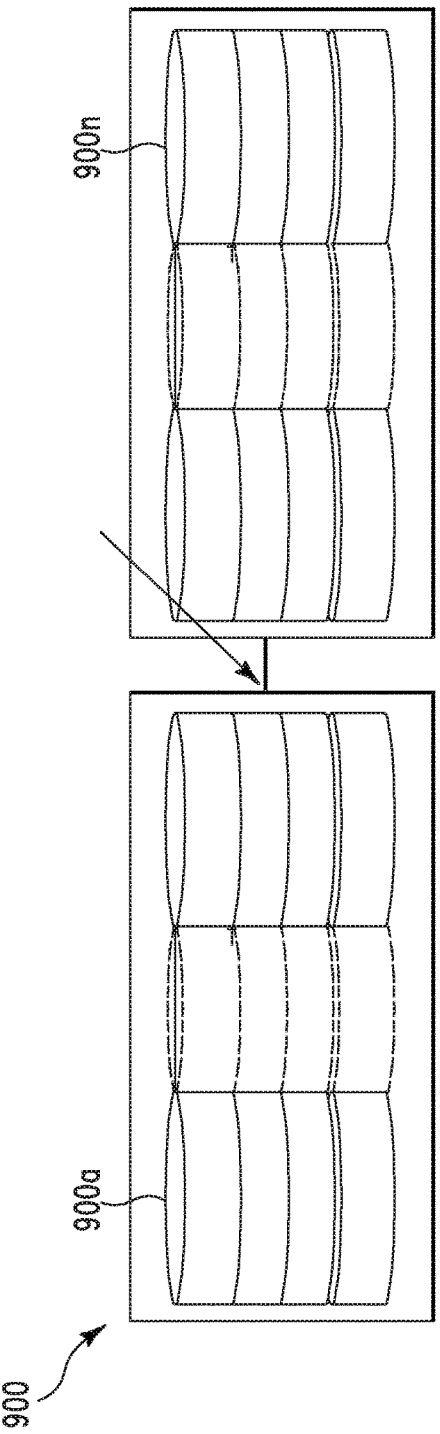
FIG. 9 illustrates a system comprising alternative BCUs for deploying for deploying appliances of same category/family but different generations as a cluster of clusters, in accordance with embodiments of the present invention.

FIG. 9 illustrates a system 900 comprising BCUs 900a . . . 900n for deploying appliances of same category/family but different generations as a cluster of clusters, in accordance with embodiments of the present invention. System 900 comprises ODS and FACT tables deployed on an ISAS cluster. System 900 comprises aggregates tables and cubes deployed on BCUs.

Figure 10:
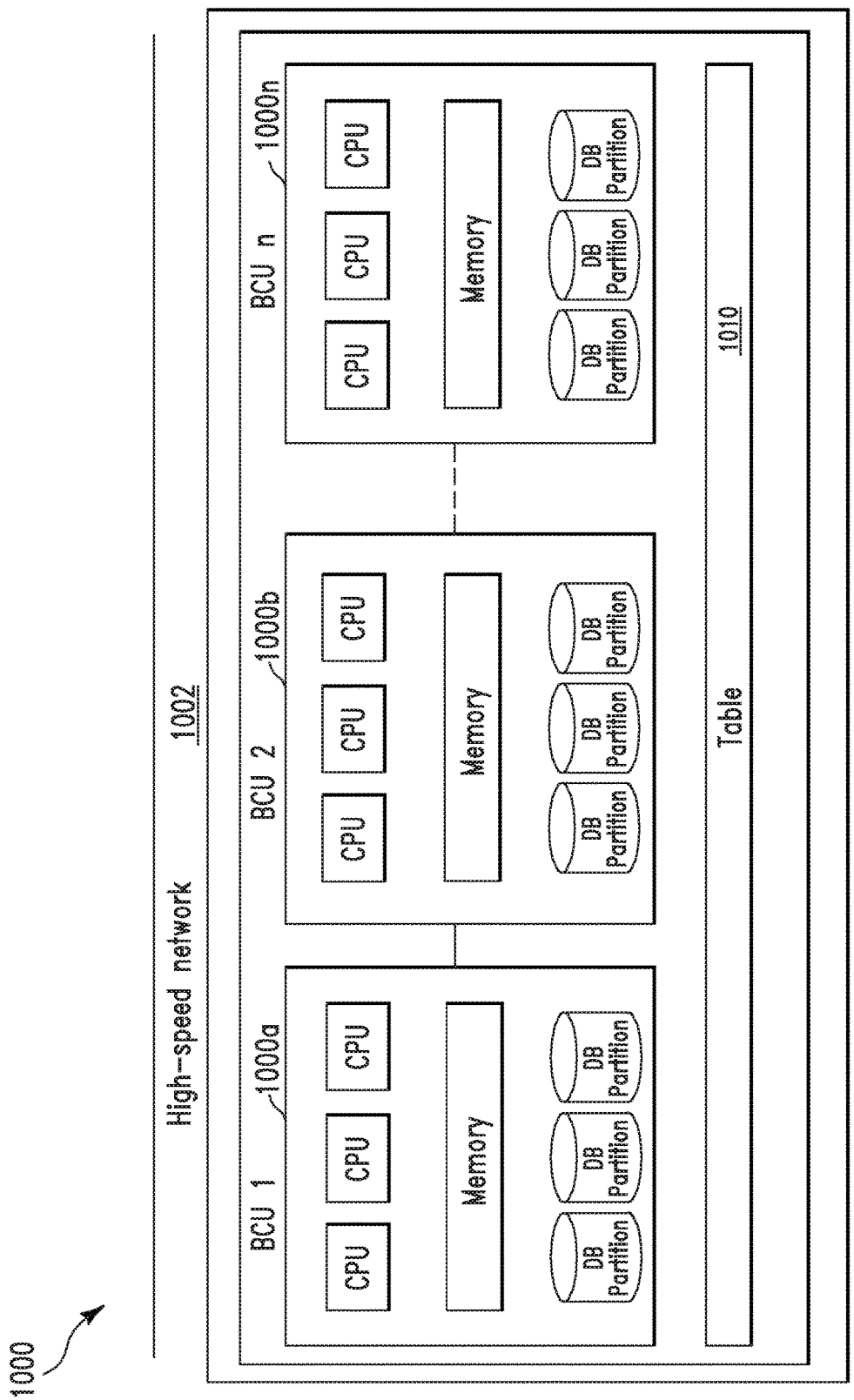
FIG. 10 illustrates a system comprising BCUs associated with a database in clustered SMP environment, in accordance with embodiments of the present invention.

FIG. 10 illustrates a system 1000 comprising BCUs 1000a . . . 1000n associated with a database in clustered SMP environment, in accordance with embodiments of the present invention. BCUs 1000a . . . 1000n are connected via a high speed network 1002. Each of BCUs 1000a . . . 1000n comprises a combination of resources related to a data warehouse. The resources may include, inter alia: processors, memory, I/O, storage, DB2 database partitions, DB2 configuration parameters under a single operating system, etc. The resources are divided and balanced to make up a single practical building block (i.e., an appliance) that is scalable. Larger systems may be configured by combining several building blocks into one system image. The database partitions may be spread over a number of BCUs to form a cluster of BCUs that are connected by a high-speed, scalable communication network thereby allowing a database to scale, in a linear fashion, beyond the limits of a single physical BCU. A table in a clustered environment may be spread over several partitions across BCUs.

Figure 11:
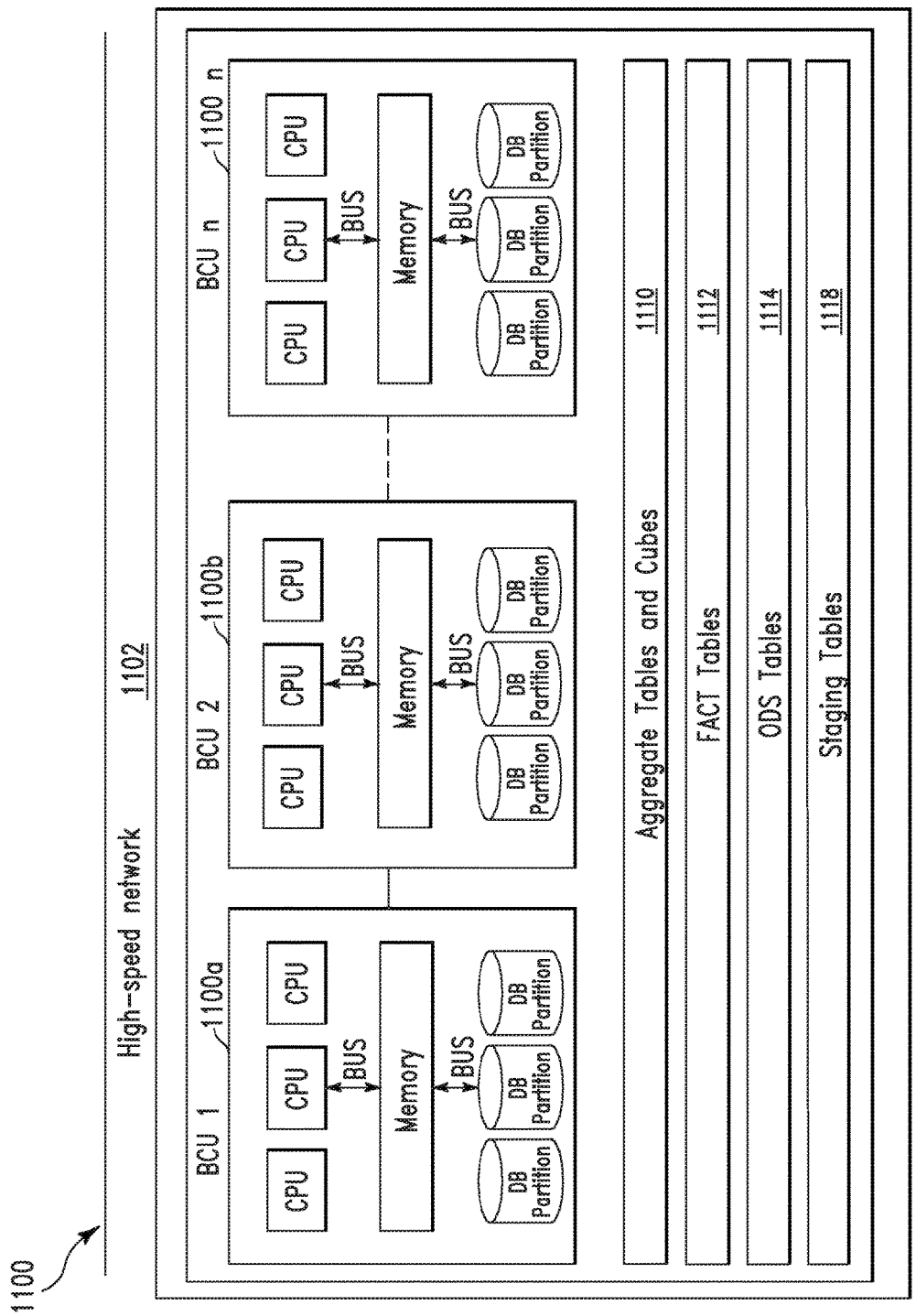
FIG. 11 illustrates a system comprising alternative BCUs associated with a database in clustered SMP environment, in accordance with embodiments of the present invention.

FIG. 11 illustrates a system 1100 comprising BCUs 1100a ... 1100n associated with a database in clustered SMP environment, in accordance with embodiments of the present invention. BCUs 1100a ... 1100n are connected via a high speed network 1102. System 1100 illustrates tables (i.e., a physical and logical view) in a clustered BCU environment for a data warehouse. System 1100 allows raw input data to loaded into a staging table (e.g., staging tables 1118) and moved to an operational data store (ODS) table 1114 for storage of daily input data. ODS data is subsequently moved to FACT tables 1112 containing historical data. Data within FACT tables 1112 is aggregated and moved to aggregate tables 1110 using business logic defined for aggregation. All the tables are distributed over DB partitions spread across the BCUs.

Figure 12:
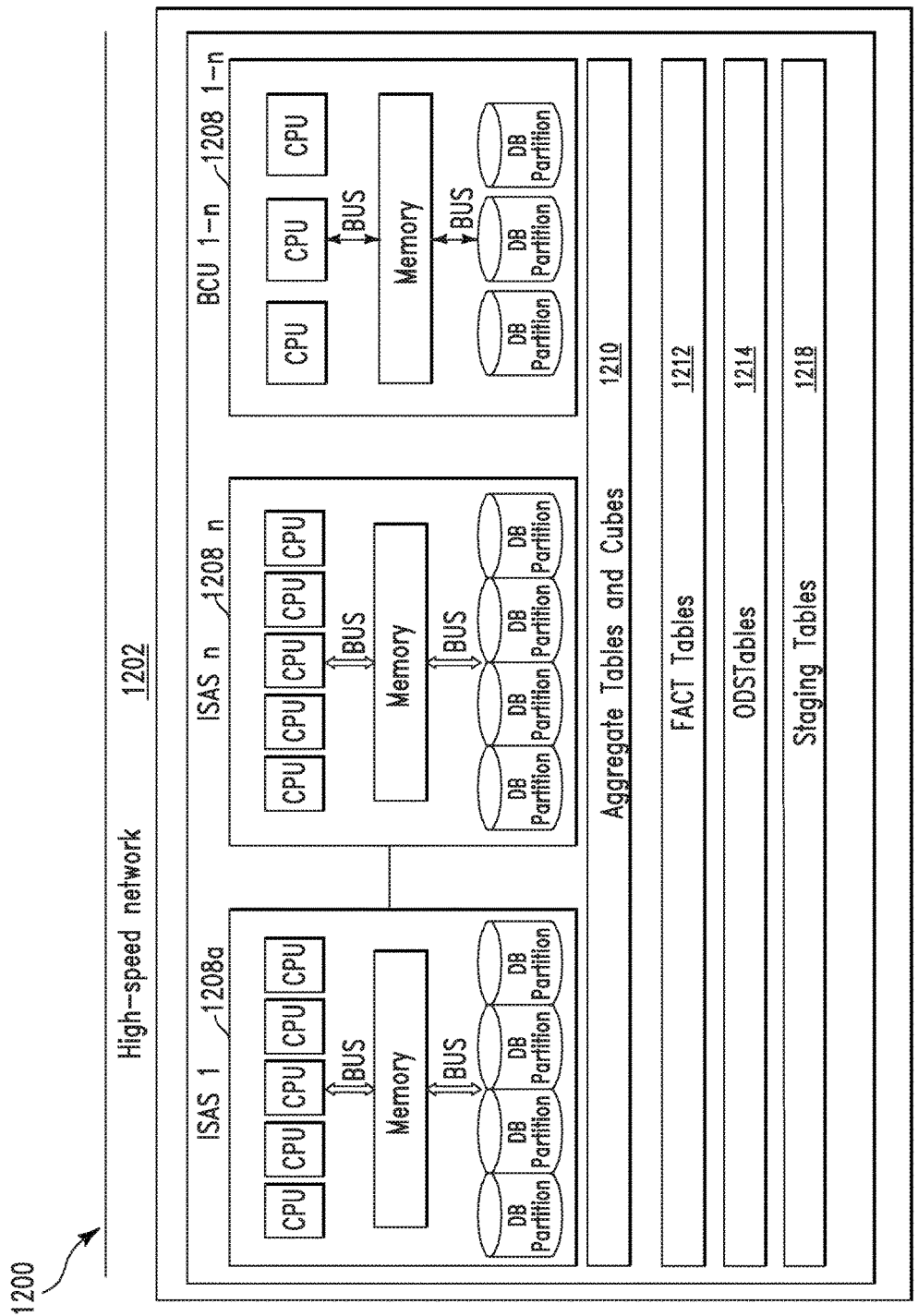
FIG. 12 illustrates a system comprising ISAS appliances associated with a mixed deployment configuration environment, in accordance with embodiments of the present invention.

FIG. 12 illustrates a system 1200 comprising ISAS appliances 1208a ... 1208 1-n associated with a mixed deployment configuration environment, in accordance with embodiments of the present invention. ISAS appliances 1208a ... 1208 1-n are connected via a high speed network 1202. System 1200 illustrates a mixed deployment configuration (i.e., physical & logical) occurring when next generation appliances (e.g., ISAS appliances 1208a ... 12081-n) are added to an existing appliance cluster (e.g., BCUs) for capacity expansion. Tables are distributed over all appliances in within a cluster. Next generation appliances are associated with a higher configuration in terms of resources/unit and performance. System 1100 allows raw input data to loaded into a staging table (e.g., staging tables 1218) and moved to an operational data store (ODS) table 1214 for storage of daily input data. ODS data is subsequently moved to FACT tables 1212 containing historical data. Data within FACT tables 1212 is aggregated and moved to aggregate tables 1210 using business logic defined for aggregation.

Figure 13:
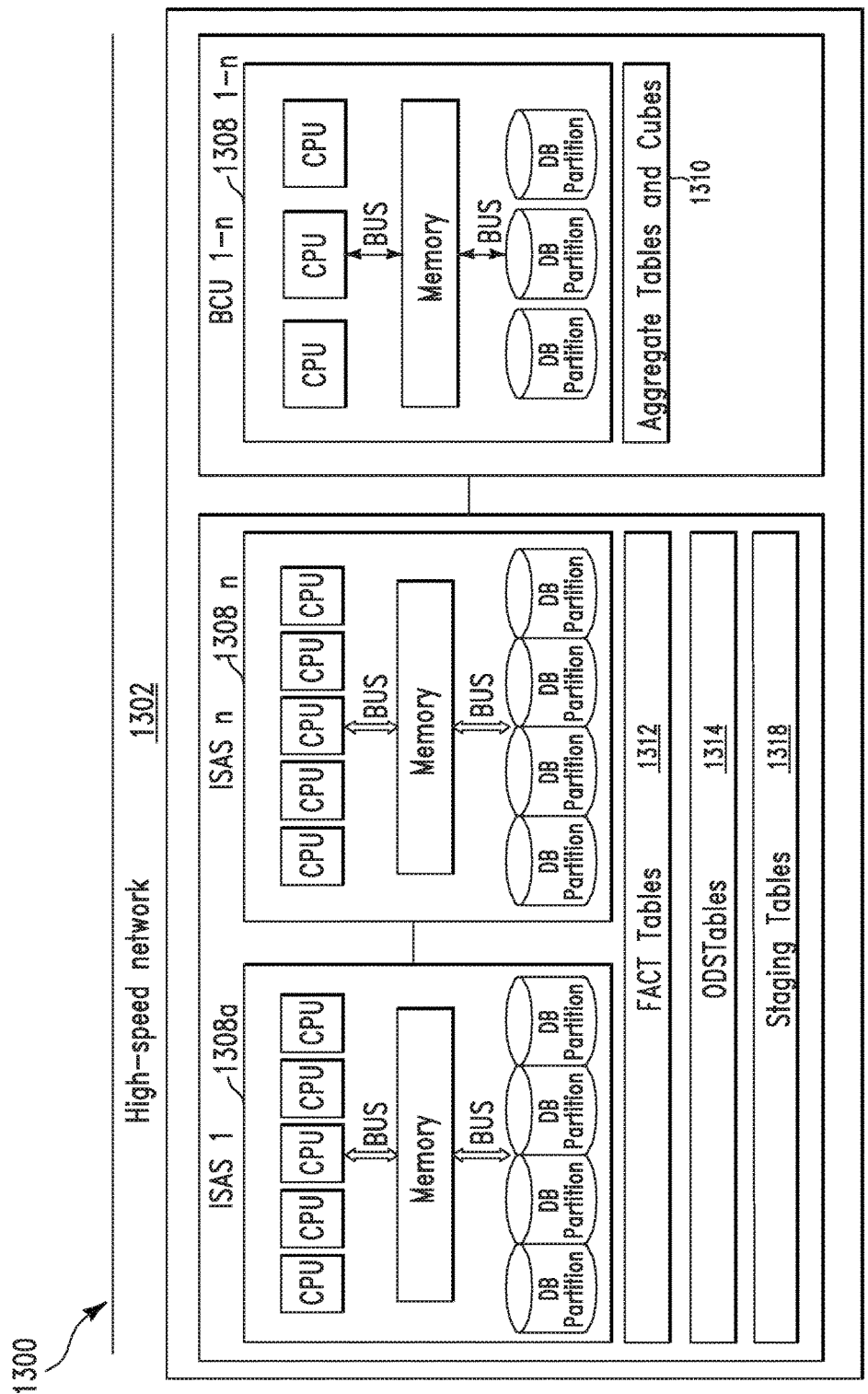
FIG. 13 illustrates a system comprising ISAS appliances associated with a mixed generation configuration environment, in accordance with embodiments of the present invention.

FIG. 13 illustrates a system 1300 comprising ISAS appliances 1308a ... 1308 1-n associated with a mixed generation configuration environment, in accordance with embodiments of the present invention. ISAS appliances 1308a ... 1308 1-n are connected via a high speed network 1302. System 1300 illustrates a multiple generation configuration. A mixed cluster is divided into two sub-clusters each comprising a same type of appliance. The sub-clusters are connected through a fast local area network. Data tables (FACT tables 1312, ODS tables 1314, and staging tables 1318) requiring high performance and scalability are deployed on the cluster (i.e., comprising new generation appliances) of ISAS appliances 1308a ... 1308n. Aggregate tables and cubes 1310 (requiring less scalability) are deployed on the other cluster of ISAS appliances 1308 1-n. Internal processes of system 1300 are reconfigured such that movement of data from one sub-cluster to the other is seamless (e.g., from FACT tables 1312 to aggregate tables 1310) and logically appear as if the deployment were on a single cluster of appliances.

Figure 14A:
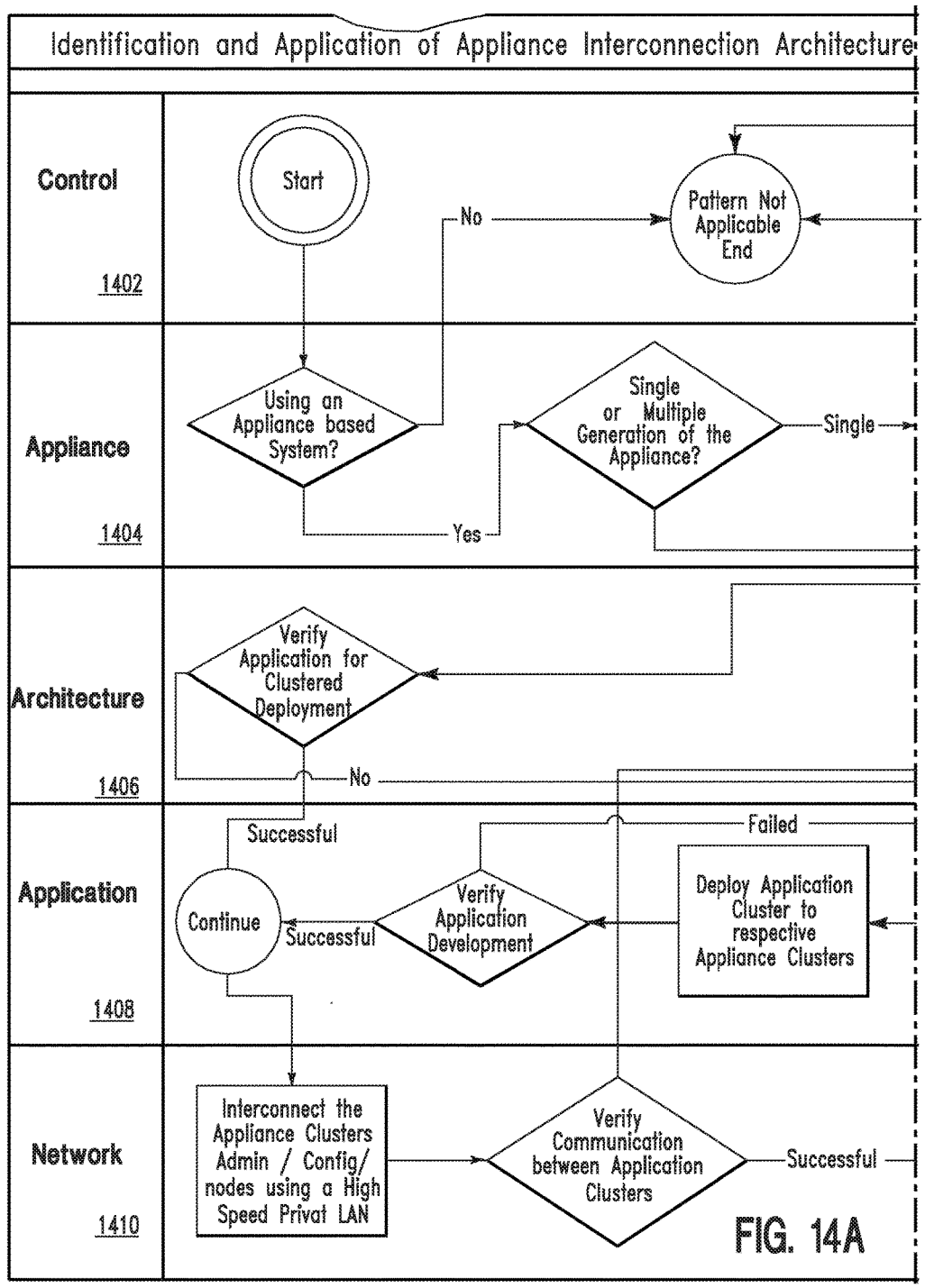
Figure 14B:
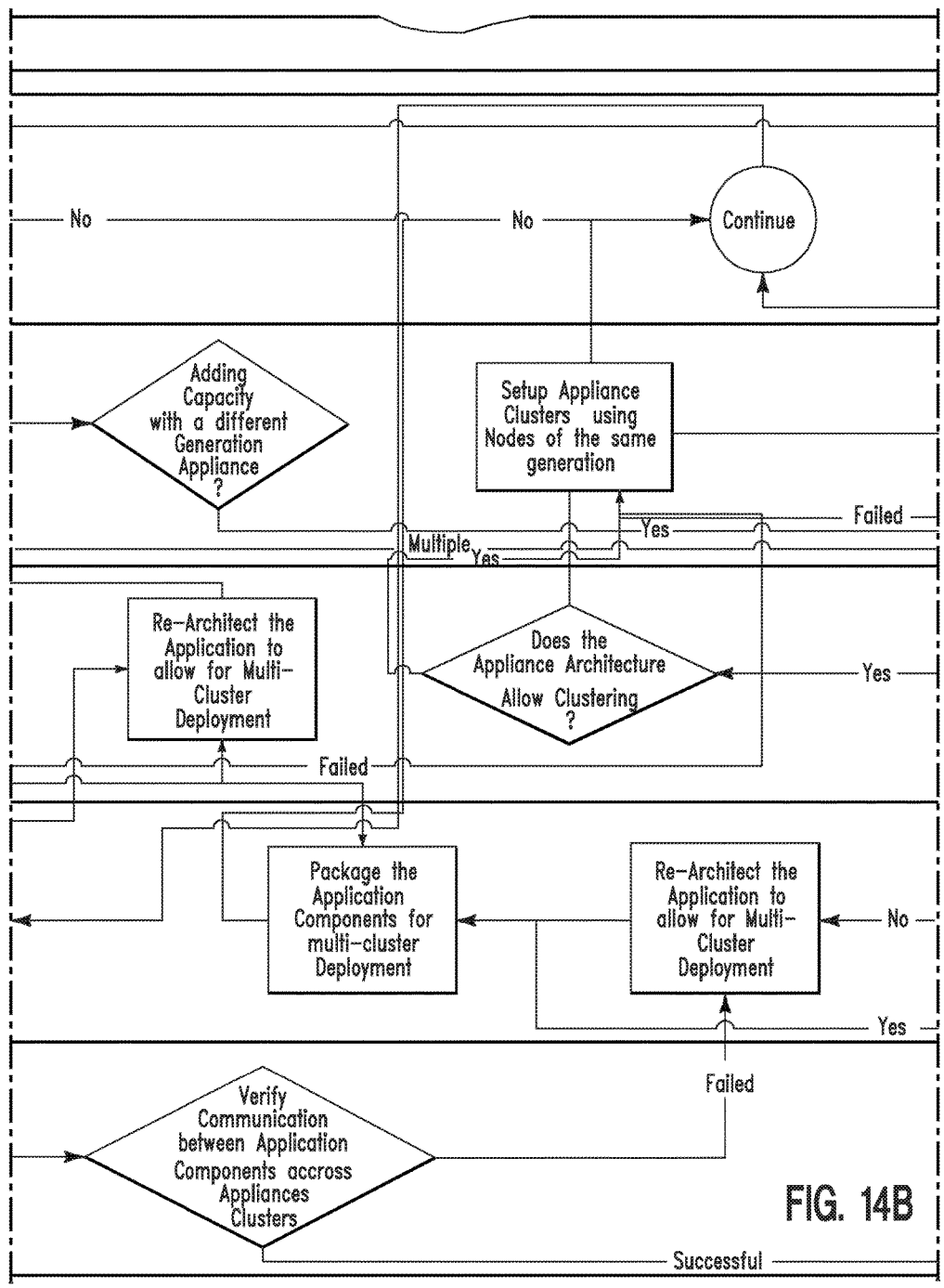

FIG. 14, including FIGS. 14A, 14B, and 14C, illustrates an algorithm detailing a system flow defining identification and application of appliance interconnection architecture, in accordance with embodiments of the present invention. The system flow in FIG. 14 illustrates applications of BCU and ISAS appliances of different generations from a same family. When appliance instances from a same family (and from different generations) are deployed in a clustered environment appliance instances (irrespective of the generation of the appliance instance) are clustered forming a single logical and physical cluster. The appliance interconnection architecture pattern (defined by the system flow) in FIG. 14 illustrates a method to architect, design, and deploy appliances such that the capacity of appliance instances belonging to different generations perform at optimal thru put regardless of generations. The system flow comprises a control layer 1402, an appliance layer 1404, an architecture layer 1406, an application layer 1408, and a network layer 1410. The control layer 1402 initiates and terminates the process. The appliance layer 1404 determines appliance generations and clusters. The architecture layer 1406 verifies clustering deployment. The application layer 1408 verifies application components and clusters. The network layer 1410 determines and verifies communications between appliance cluster and application components.

Figure 15A:
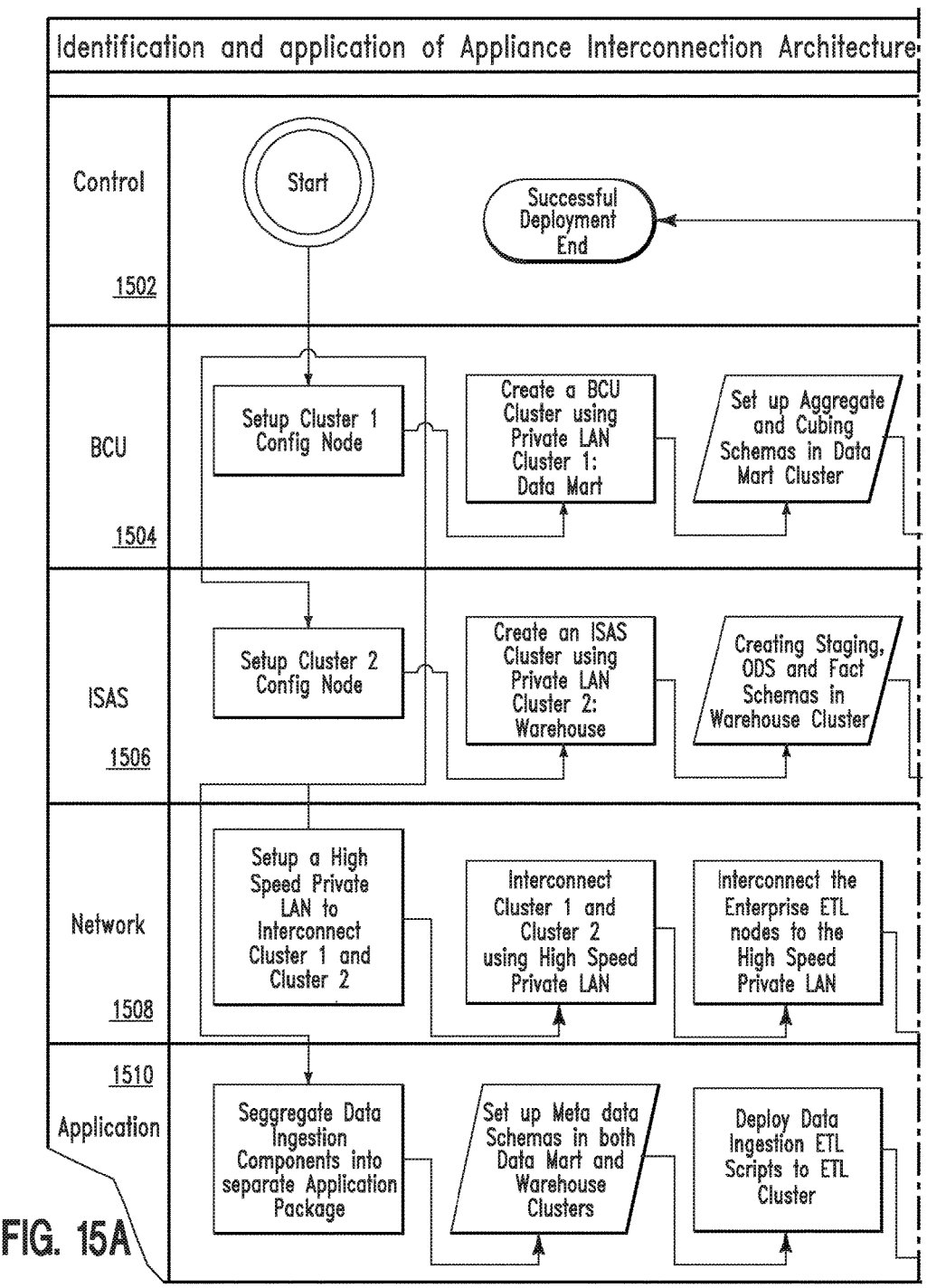
FIGS. 15A and 15B, illustrates an algorithm detailing a system flow defining application interconnection architecture, in accordance with embodiments of the present invention.
Figure 15B:
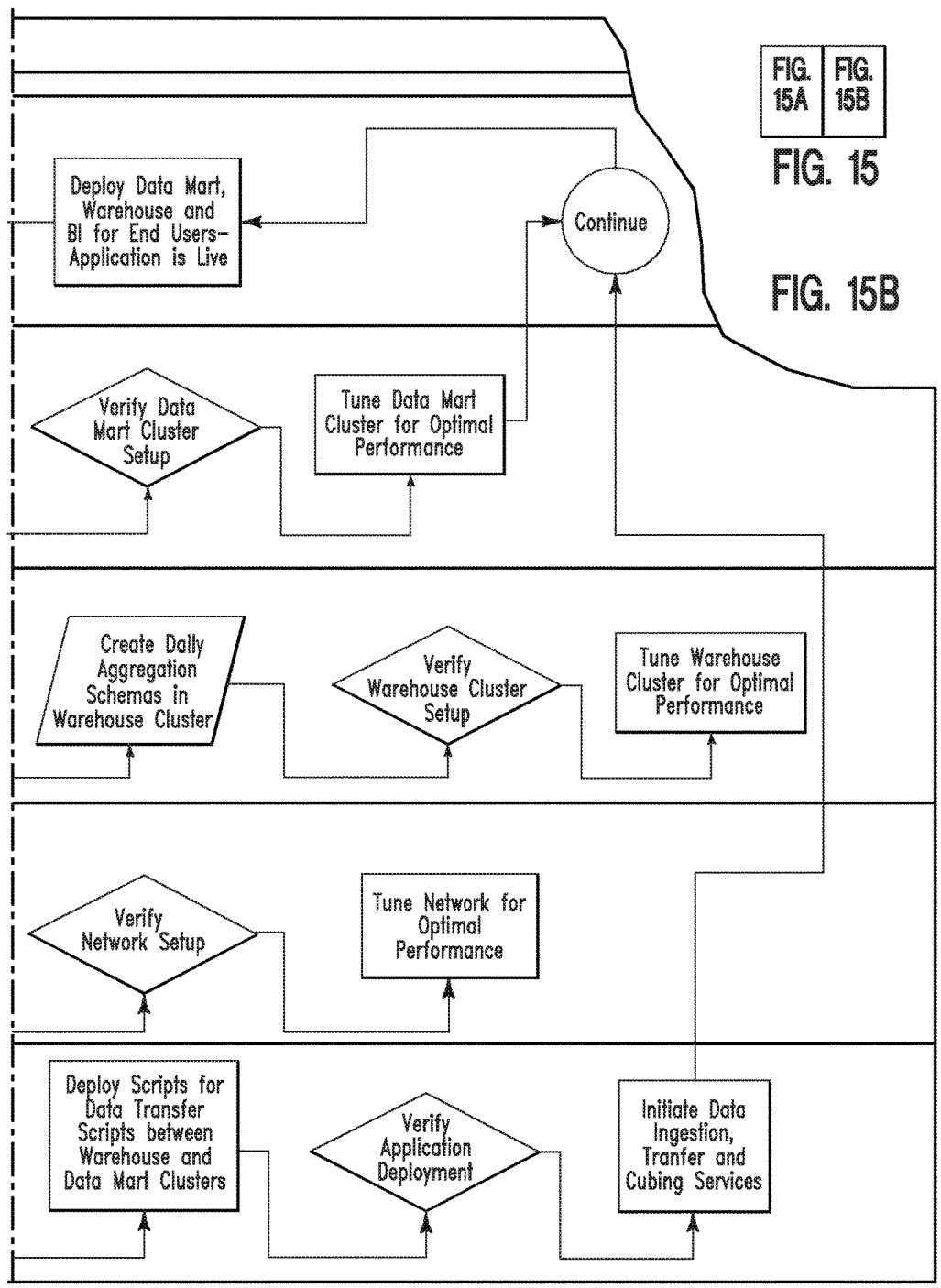

FIG. 15, including FIGS. 15A and 15B, illustrates an algorithm detailing a system flow defining application interconnection architecture, in accordance with embodiments of the present invention. The system flow in FIG. 14 illustrates an appliance interconnection architecture pattern applicable when a user has appliances of different generations of a same family. The appliances are clustered (i.e., if each of the generations has more than 1 instance). That appliance cluster comprises a designated administrator/configuration node in each of the physical clusters. If multiple generational clusters of appliances are required, the appliance interconnection pattern (illustrated in FIG. 15) recommends that instances belonging to a given generation be clustered together as a single physical cluster. Different clusters are interconnected (via a private high-speed network connection) at the administrator/configuration node of every individual physical cluster in order to form a single logical instance of an appliance. The appliance architecture is re-architected such that, components may be grouped together into packages such that one or more packages could be deployed on each of physical appliance cluster created. During each step of the algorithm, all interconnections are verified. The system flow comprises a control layer 1502, a BCU layer 1504, an ISAS layer 1506, a network layer 1508, and an application layer 1510. The control layer 1502 initiates and terminates the process. The BCU layer 1504 creates clusters and aggregates. The ISAS 1506 generates clusters and schemas. The network layer 1408 determines and verifies communications between clusters. The application layer 1410 generates schemas and deploys scripts.

Figure 16:
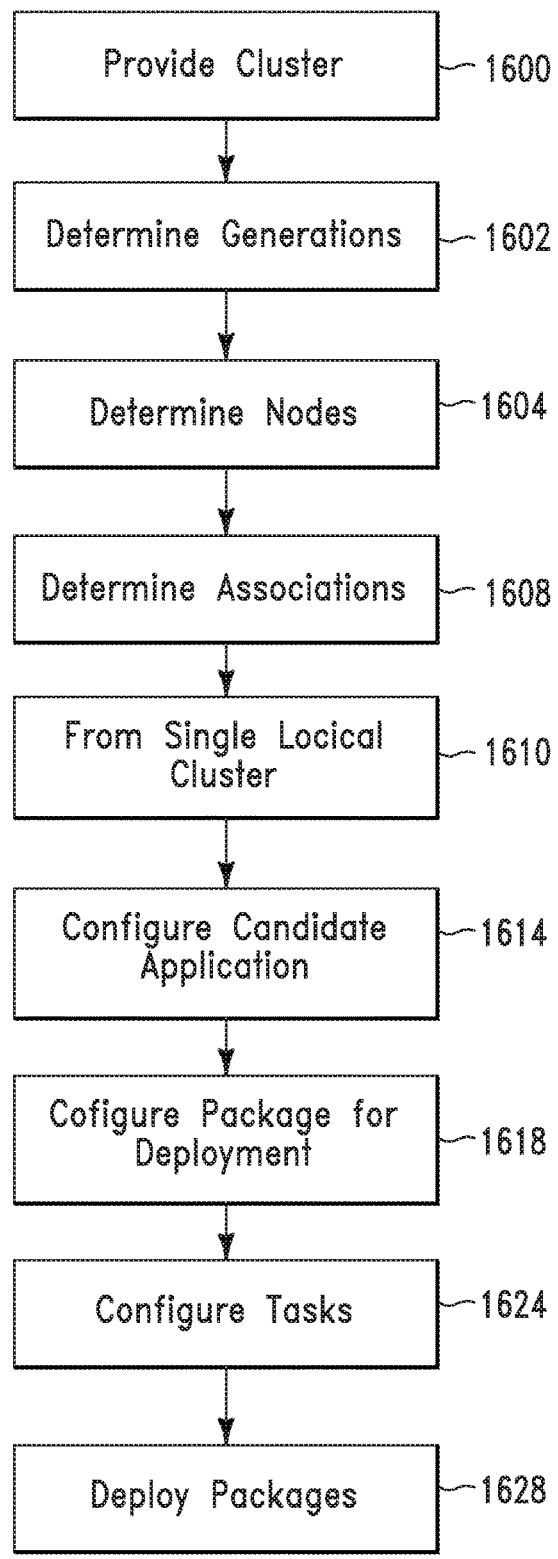
FIG. 16 illustrates an algorithm detailing a process flow enabled by the systems of FIGS. 1-15 for deploying appliances of same category/family but different generations as a cluster of clusters, in accordance with embodiments of the present invention.

FIG. 16 illustrates an algorithm detailing a process flow enabled by the systems of FIGS. 1-15 for deploying appliances of same category/family but different generations as a cluster of clusters, in accordance with embodiments of the present invention. Each of the steps in the algorithm of FIG. 16 may be enabled and executed by a computer processor executing computer code. In step 1600, a logical cluster of appliances (interconnected via a high speed private local area network (LAN)) is provided. The logical cluster of appliances includes a plurality of physical sub-clusters (i.e., interconnected via the high speed private LAN) of appliance nodes. In step 1602, it is determined that each node of the appliance nodes comprises a different generation node. In step 1604, it is determined that a sub-cluster (N) (of the physical sub-clusters) comprises a first plurality of nodes of the appliance nodes. In step 1608, it is determined that the sub-cluster (N) is associated with a plurality of (M) generation appliances of the logical cluster of appliances. Each appliance of the plurality of (M) generation appliances comprises a same type of appliance. (N) comprises a first cluster number and (M) comprises a first generation number of a first generation. In step 1610, a single logical cluster is formed from a combination of the plurality of sub-clusters. In step 1614, a candidate application for deployment on the logical cluster of appliances is configured as a logical grouping of independent application components of a package. In step 1618, the package is configured for deployment on different appliance sub-clusters such that the candidate application, comprising a group of packages, comprises a single logical entity. In step 1624, the plurality of physical sub-clusters are configured to perform independent tasks such that first packages of the packages performing heavy duty workloads are deployed on higher capacity sub-clusters than second packages of the packages performing less demanding workloads than the heavy duty workloads. In step 1628, the second packages are deployed on lower capacity sub-clusters such an output of the single logical cluster is maximized.

Figure 17:
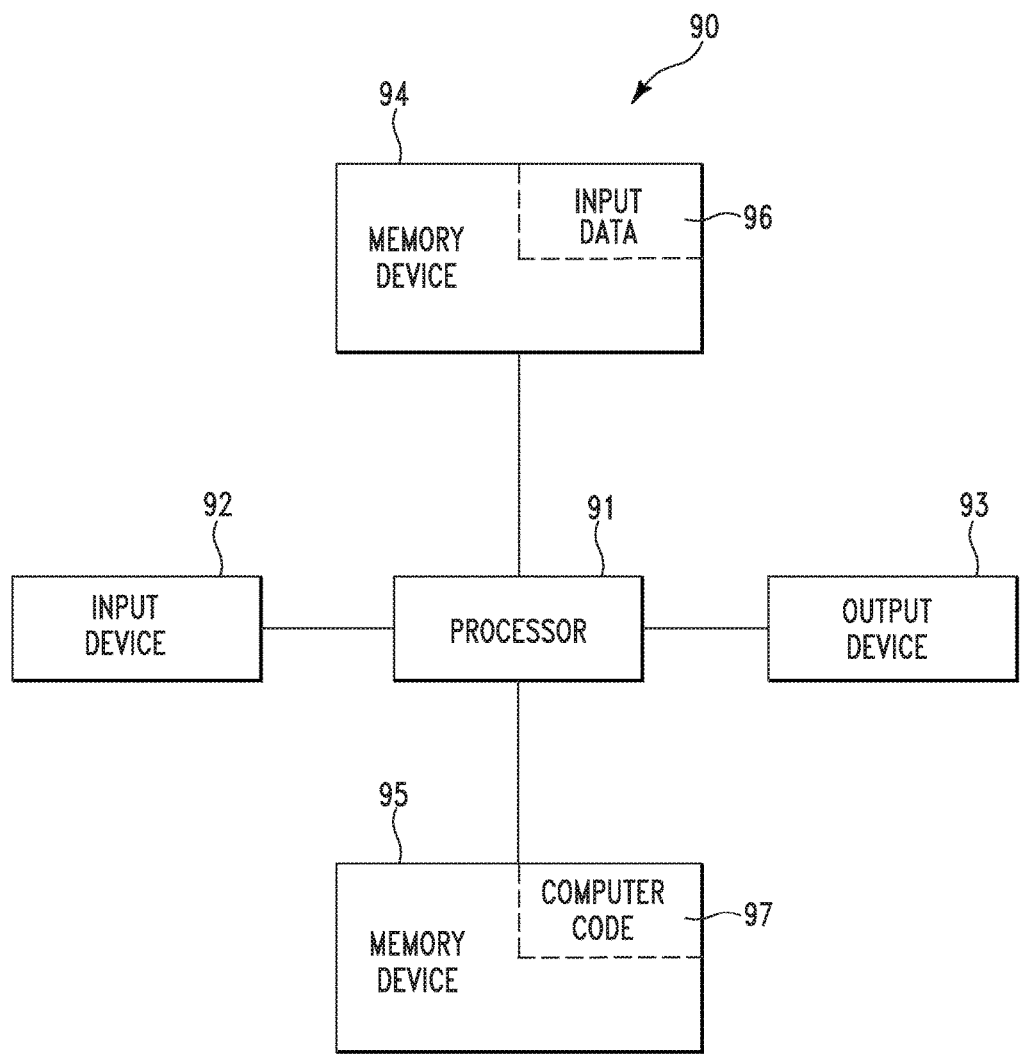
FIG. 17 illustrates a computer apparatus used by the systems of FIGS. 1-15 for deploying appliances of same category/family but different generations as a cluster of clusters, in accordance with embodiments of the present invention.

FIG. 17 illustrates a computer apparatus 90 used by the systems of FIGS. 1-15 for deploying appliances of same category/family but different generations as a cluster of clusters, in accordance with embodiments of the present invention. The computer system 90 includes a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 14-16) for deploying appliances of same category/family but different generations as a cluster of clusters. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 17) may include the algorithms of FIGS. 14-16 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

Still yet, any of the components of the present invention could be created, integrated, hosted, maintained, deployed, managed, serviced, etc. by a service supplier who offers to deploy appliances of same category/family but different generations as a cluster of clusters. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for deploying appliances of same category/family but different generations as a cluster of clusters. In another embodiment, the invention provides a business method that performs the process steps of the invention on a subscription, advertising, and/or fee basis. That is, a service supplier, such as a Solution Integrator, could offer to deploy appliances of same category/family but different generations as a cluster of clusters. In this case, the service supplier can create, maintain, and support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 17 shows the computer system 90 as a particular configuration of hardware and software, any configuration of hardware and software, as would be known to a person of ordinary skill in the art, may be utilized for the purposes stated supra in conjunction with the particular computer system 90 of FIG. 17. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A system comprising:
a high speed private local area network (LAN); and
a logical cluster of appliances comprising a plurality of physical sub-clusters of appliance nodes, wherein a sub-cluster (N) of said plurality of physical sub-clusters comprises a first plurality of nodes of said appliance nodes, wherein said first plurality of nodes comprises an appliance node, wherein said appliance node comprises a virtualization node, a tape volume cache (TVC), a hierarchal storage node, and a library manager, wherein said virtualization node comprises a watchdog timer enabling said virtualization node to be restarted during a malfunction, wherein said TVC caches data read from an associated logical volume, wherein said hierarchal storage node uses tokens to determine which of said first plurality of nodes comprises a current data copy, wherein said library manager comprises a plurality of physical tape drives and a robotic accessor for transferring magnetic tape to said plurality of physical tape drives, wherein said sub-cluster (N) is associated with a plurality of (M) generation appliances of said logical cluster of appliances, wherein each appliance of said plurality of (M) generation appliances comprises a same type, category, and family of appliance, wherein (N) comprises a first cluster number, wherein (M) comprises a first generation number of a first generation comprising a first development configuration of appliances, wherein said plurality of sub-clusters, in combination, form a single logical cluster, wherein said sub-cluster (N) is connected to a sub-cluster (P) of said plurality of physical sub-clusters, wherein said sub-cluster (P) is associated with a plurality of (Q) generation appliances of said logical cluster of appliances, wherein each appliance of said plurality of (Q) generation appliances comprises a same type, category, and family of appliance, wherein (P) comprises a second cluster number, wherein (Q)

comprises a second generation number of a second generation comprising a new development configuration of appliances with respect to said first generation, and wherein said first generation differs from said second generation.

2. The appliance cluster of claim 1, wherein said sub-cluster (N) comprises first data tables comprising high performance and scalability capabilities, and wherein said sub-cluster (P) further comprises aggregate tables and cubes.

3. The system of claim 1, wherein a candidate application for deployment on said logical cluster of appliances is configured as a logical grouping of independent application components of a package, wherein said package is configured for deployment on different appliance sub-clusters such that said candidate application, comprising a group of packages, comprises a single logical entity.

4. The system of claim 3, wherein said plurality of physical sub-clusters are configured to perform independent tasks such that first packages of said packages performing heavy duty workloads are deployed on higher capacity sub-clusters than second packages of said packages performing less demanding workloads than said heavy duty workloads, wherein said second packages are deployed on lower capacity sub-clusters such an output of said single logical cluster is maximized.

5. The system of claim 3, wherein communication between said packages is established using an interconnection between said plurality of physical sub-clusters such said interconnection is transparent to application users.

6. A method comprising:
providing, a logical cluster of appliances interconnected via a high speed private local area network (LAN), wherein said logical cluster of appliances comprises a plurality of physical sub-clusters of appliance nodes;
determining, by said computer processor, that a sub-cluster (N) of said plurality of physical sub-clusters comprises a first plurality of nodes of said appliance nodes, wherein said first plurality of nodes comprises an appliance node, wherein said appliance node comprises a virtualization node, a tape volume cache (TVC), a hierarchal storage node, and a library manager, wherein said virtualization node comprises a watchdog timer enabling said virtualization node to be restarted during a malfunction, wherein said TVC caches data read from an associated logical volume, wherein said hierarchal storage node uses tokens to determine which of said first plurality of nodes comprises a current data copy, wherein said library manager comprises a plurality of physical tape drives and a robotic accessor for transferring magnetic tape to said plurality of physical tape drives;
determining, by said computer processor, that said sub-cluster (N) is associated with a plurality of (M) generation appliances of said logical cluster of appliances, wherein each appliance of said plurality of (M) generation appliances comprises a same type category, and family of appliance, wherein (N) comprises a first cluster number, and wherein (M) comprises a first generation number of a first generation comprising a first development configuration of appliances, wherein said sub-cluster (N) is connected to a sub-cluster (P) of said plurality of physical sub-clusters, wherein said sub-cluster (P) is associated with a plurality of (Q) generation appliances of said logical cluster of appliances, wherein each appliance of said plurality of (Q) generation appliances comprises a same type, category, and family of appliance, wherein (P) comprises a second cluster number, wherein (Q) comprises a second generation number of a second generation comprising a new development configuration of appliances with respect to said first generation, and wherein said first generation differs from said second generation; and
forming, by said computer processor, a single logical cluster from a combination of said plurality of sub-clusters.

7. The method of claim 6, wherein said sub-cluster (N) comprises first data tables comprising high performance and scalability capabilities, and wherein said sub-cluster (P) further comprises aggregate tables and cubes.

8. The method of claim 6, further comprising:
configuring, by said computer processor, a candidate application for deployment on said logical cluster of appliances as a logical grouping of independent application components of a package; and
configuring, by said computer processor, said package for deployment on different appliance sub-clusters such that said candidate application, comprising a group of packages, comprises a single logical entity.

9. The method of claim 8, further comprising:
configuring, by said computer processor, said plurality of physical sub-clusters to perform independent tasks such that first packages of said packages performing heavy duty workloads are deployed on higher capacity sub-clusters than second packages of said packages performing less demanding workloads than said heavy duty workloads; and
deploying, by said computer processor, said second packages on lower capacity sub-clusters such an output of said single logical cluster is maximized.

10. The method of claim 8, wherein communication between said packages is established using an interconnection between said plurality of physical sub-clusters such that said interconnection is transparent to application users.

11. The method of claim 6, further comprising providing at least one support service for at least one of creating, integrating, hosting, maintaining, and deploying computer-readable program code in a computing system, wherein the program code in combination with said computing system is configured to implement the method of claim 9.

12. A computer program product, comprising a computer readable hardware storage device storing a computer readable program code, said computer readable program code comprising an algorithm that when executed by a computer processor of a computer system implements a method, said method comprising:
determining, by a computer processor, that a logical cluster of appliances are interconnected via a high speed private local area network (LAN), wherein said logical cluster of appliances comprises a plurality of physical sub-clusters of said appliance nodes;
determining, by said computer processor, that a sub-cluster (N) of said plurality of physical sub-clusters comprises a first plurality of nodes of said appliance nodes, wherein said first plurality of nodes comprises an appliance node, wherein said appliance node comprises a virtualization node, a tape volume cache (TVC), a hierarchal storage node, and a library manager, wherein said virtualization node comprises a watchdog timer enabling said virtualization node to be restarted during a malfunction, wherein said TVC caches data read from an associated logical volume, wherein said hierarchal storage node uses tokens to determine which of said first plurality of nodes comprises a current data copy, wherein said library manager comprises a plurality of physical tape drives and a robotic accessor for transferring magnetic tape to said plurality of physical tape drives;

determining, by said computer processor, that a sub-cluster (N) of said plurality of physical sub-clusters comprises a first plurality of nodes of said appliance nodes;

determining, by said computer processor, that said sub-cluster (N) is associated with a plurality of (M) generation appliances of said logical cluster of appliances, wherein each appliance of said plurality of (M) generation appliances comprises a same type category, and family of appliance, wherein (N) comprises a first cluster number, and wherein (M) comprises a first generation number of a first generation comprising a first development configuration of appliances, wherein said sub-cluster (N) is connected to a sub-cluster (P) of said plurality of physical sub-clusters, wherein said sub-cluster (P) is associated with a plurality of (Q) generation appliances of said logical cluster of appliances, wherein each appliance of said plurality of (Q) generation appliances comprises a same type, category, and family of appliance, wherein (P) comprises a second cluster number, wherein (Q) comprises a second generation number of a second generation comprising a new development configuration of appliances with respect to said first generation, and wherein said first generation differs from said second generation; and forming, by said computer processor, a single logical cluster from a combination of said plurality of sub-clusters.

13. The computer program product of claim 12, wherein said sub-cluster (N) comprises first data tables comprising high performance and scalability capabilities, and wherein said sub-cluster (P) further comprises aggregate tables and cubes.

14. The computer program product of claim 12, wherein said method further comprises:

configuring, by said computer processor, a candidate application for deployment on said logical cluster of appliances as a logical grouping of independent application components of a package; and configuring, by said computer processor, said package for deployment on different appliance sub-clusters such that said candidate application, comprising a group of packages, comprises a single logical entity.

15. The computer program product of claim 14, wherein said method further comprises:

configuring, by said computer processor, said plurality of physical sub-clusters to perform independent tasks such that first packages of said packages performing heavy duty workloads are deployed on higher capacity sub-clusters than second packages of said packages performing less demanding workloads than said heavy duty workloads; and deploying, by said computer processor, said second packages on lower capacity sub-clusters such an output of said single logical cluster is maximized.

16. The computer program product of claim 14, wherein said method further comprises:

wherein communication between said packages is established using an interconnection between said plurality of physical sub-clusters such that said interconnection is transparent to application users.

* * * * *